US008479092B1

(12) United States Patent
Pandey

(10) Patent No.: US 8,479,092 B1
(45) Date of Patent: Jul. 2, 2013

(54) CONTENT LAYOUT FOR AN ELECTRONIC DOCUMENT

(75) Inventor: Krishna Kumar Pandey, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 566 days.

(21) Appl. No.: 12/433,282

(22) Filed: Apr. 30, 2009

(51) Int. Cl.
*G06F 17/00* (2006.01)

(52) U.S. Cl.
USPC .......... 715/252; 715/243; 715/244; 715/245; 715/246; 715/247; 715/248; 715/249; 715/253; 715/254

(58) Field of Classification Search
USPC ................... 715/243–249, 252–254
See application file for complete search history.

(56) References Cited

U.S. PATENT DOCUMENTS

| | | | |
|---|---|---|---|
| 6,449,639 B1* | 9/2002 | Blumberg | 709/217 |
| 7,096,423 B2 | 8/2006 | Murata | |
| 7,272,258 B2 | 9/2007 | Berkner et al. | |
| 7,322,007 B2 | 1/2008 | Schowtka et al. | |
| 7,356,760 B2 | 4/2008 | Jaeger | |
| 7,487,444 B2 | 2/2009 | Lira | |
| 7,574,486 B1* | 8/2009 | Cheng et al. | 709/219 |
| 7,853,871 B2* | 12/2010 | Simons et al. | 715/238 |
| 2002/0116418 A1 | 8/2002 | Lachhwani et al. | |
| 2003/0079177 A1* | 4/2003 | Brintzenhofe et al. | 715/500 |
| 2004/0205460 A1 | 10/2004 | Gopalan | |
| 2004/0205608 A1* | 10/2004 | Huang | 715/521 |
| 2004/0255003 A1 | 12/2004 | Tecu et al. | |
| 2005/0172225 A1* | 8/2005 | Kobashi et al. | 715/517 |
| 2006/0107204 A1* | 5/2006 | Epstein | 715/517 |
| 2006/0179405 A1 | 8/2006 | Chao et al. | |
| 2006/0224952 A1 | 10/2006 | Lin | |
| 2006/0294460 A1 | 12/2006 | Chao et al. | |
| 2007/0061384 A1* | 3/2007 | Harrington et al. | 707/203 |
| 2007/0078711 A1 | 4/2007 | Anand | |
| 2007/0263650 A1 | 11/2007 | Subramania et al. | |
| 2008/0139191 A1* | 6/2008 | Melnyk et al. | 455/419 |
| 2010/0083163 A1* | 4/2010 | Maghoul et al. | 715/781 |

OTHER PUBLICATIONS

Adobe, Using Adobe Acrobat 9 Pro, "Chapter 3: Creating PDFs", copyright 2009 Adobe Systems Incorporated, Updated Mar. 11, 2009, cover page, copyright page, pp. 58-111.
Nuke Anything Enhanced, Version 0.6, URL: http://download.cnet.com/Nuke-Anything-Enhanced/3000-11745_4-10799380.html, dated Jan. 22, 2008, 5 pages.
Nuke Anything Enhanced, Version 0.68.1, URL: http://download.cnet.com/Nuke-Anything-Enhanced/3000-11745_4-10845876.html, dated May 23, 2008, 6 pages.

* cited by examiner

*Primary Examiner* — Doug Hutton, Jr.
*Assistant Examiner* — Andrew Dyer
(74) *Attorney, Agent, or Firm* — Moser Taboada

(57) ABSTRACT

Methods, systems, and apparatus, including computer programs encoded on one or more computer storage media, for modifying content layout for an electronic document are described. In one aspect, a method includes receiving an identification of a subset of content items identified in a first electronic document. Each content item in the subset of content items includes displayable data. A prioritization of the subset of content items is identified, and a first content item is selected based on the prioritization. A new value of a first layout property for the selected content item is calculated based at least in part on one or more initial values. A new electronic document is generated. The new electronic document includes an identification of the new value and data for generating a second graphical representation of the subset of content items based at least in part on the new value.

21 Claims, 9 Drawing Sheets

FIG. 2A boston.com — 202          200

▼Local Search  Site Search
[            ] GO

HOME / NEWS / NATION / WASHINGTON — 204
Obama promises to limit no-bid contracts — 206
Says $40 billion could be saved every year
Associated Press and Globe Staff / March 5, 2009 — 208

✉ Email | 🖨 Print | 📄 Single Page | ⓑ Yahoo! Buzz | ShareThis    Text size ➖ ➕

WASHINGTON - President Obama ordered an ← 210a
overhaul yesterday of the way the US government
awards defense and other contracts, saying that more
competition is needed to drive down costs and
declaring that "the days of giving government
contractors a blank check are over."

Obama joined Senator John McCain, his Republican
presidential campaign rival, and other congressional
figures to promise taxpayers savings of as much as $40
billion a year, in part by limiting no-bid contracts.

Even in good economic times, contracting reform
would be overdue in Washington, Obama said, but
with the recession, "It's time for this waste and
inefficiency to end. It's time for a government that only
invests in what works."

The president announced an executive memorandum
that directs his budget director, Peter Orszag, to work
with Cabinet and agency officials to come up by July 1
with a way to review existing contracts for waste or
fraud.

By the end of September, Orszag is to come up with
new rules designed to make it more difficult for
contractors to cheat taxpayers by strengthening
oversight and ending unnecessary no-bid contracts and
"cost-plus" contracts that allow price tags to escalate.
The new rules would also make some halftrillion
dollars in federal contracts each year more accessible
to independent contractors.

ADVERTISEMENT
What does $30 buy nowadays?
Get 3x the books on CD and
still have change for coffee
simply audiobooks.com 212
214

INSIDE BOSTON.COM
THE INK TANK
The best editorial cartoons
from around the nation
FOREVER YOUNG Obama promises to limit no-bid contracts - The Boston Globe          220

Obama promises to limit no-bid contracts ─── 204
Says $40 billion could be saved every year ─────── 206
WASHINGTON - President Obama ordered an overhaul yesterday of the way the US government awards defense and other contracts, saying that more competition is needed to drive down costs and declaring that "the days of giving government contractors a blank check are over."      210b Obama joined Senator John McCain, his Republican presidential campaign rival, and other congressional figures to promise taxpayers savings of as much as $40 billion a year, in part by limiting no-bid contracts.

Even in good economic times, contracting reform would be overdue in Washington, Obama said, but with the recession, "It's time for this waste and inefficiency to end. It's time for a government that only invests in what works."

The president announced an executive memorandum that directs his budget director, Peter Orszag, to work with Cabinet and agency officials to come up by July 1 with a way to review existing contracts for waste or fraud.

By the end of September, Orszag is to come up with new rules designed to make it more difficult for contractors to cheat taxpayers by strengthening oversight and ending unnecessary no-bid contracts and "cost-plus" contracts that allow price tags to escalate. The new rules would also make some halftrillion dollars in federal contracts each year more accessible to independent contractors.

http://www.boston.com/news/nation/washington/articles/2009/03/05/obama_promises_to_limit_no_bid_contracts/[3/5/2009 12:27:08 PM]

FIG. 2B

Obama promises to limit no-bid contracts - The Boston Globe    230a

Obama promises to limit no-bid contracts ——— 204
Says $40 billion could be saved every year ——————— 206
WASHINGTON - President Obama ordered an
overhaul yesterday of the way the US government                    210a
awards defense and other contracts, saying that more
competition is needed to drive down costs and
declaring that "the days of giving government
contractors a blank check are over."

Obama joined Senator John McCain, his Republican
presidential campaign rival, and other congressional
figures to promise taxpayers savings of as much as $40
billion a year, in part by limiting no-bid contracts.

Even in good economic times, contracting reform
would be overdue in Washington, Obama said, but
with the recession, "It's time for this waste and
inefficiency to end. It's time for a government that only
invests in what works."

The president announced an executive memorandum
that directs his budget director, Peter Orszag, to work
with Cabinet and agency officials to come up by July 1
with a way to review existing contracts for waste or
fraud.

By the end of September, Orszag is to come up with http://www.boston.com/news/nation/washington/articles/2009/03/05/obama_promises_
to_limit_no_bid_contracts/[3/5/2009 12:27:08 PM]

FIG. 2C

Obama promises to limit no-bid contracts - The Boston Globe        230b new rules designed to make it more difficult for
contractors to cheat taxpayers by strengthening
oversight and ending unnecessary no-bid contracts and        210a
"cost-plus" contracts that allow price tags to escalate.
The new rules would also make some halftrillion
dollars in federal contracts each year more accessible
to independent contractors.

http://www.boston.com/news/nation/washington/articles/2009/03/05/obama_promises_
to_limit_no_bid_contracts/[3/5/2009 12:27:08 PM]

FIG. 2D

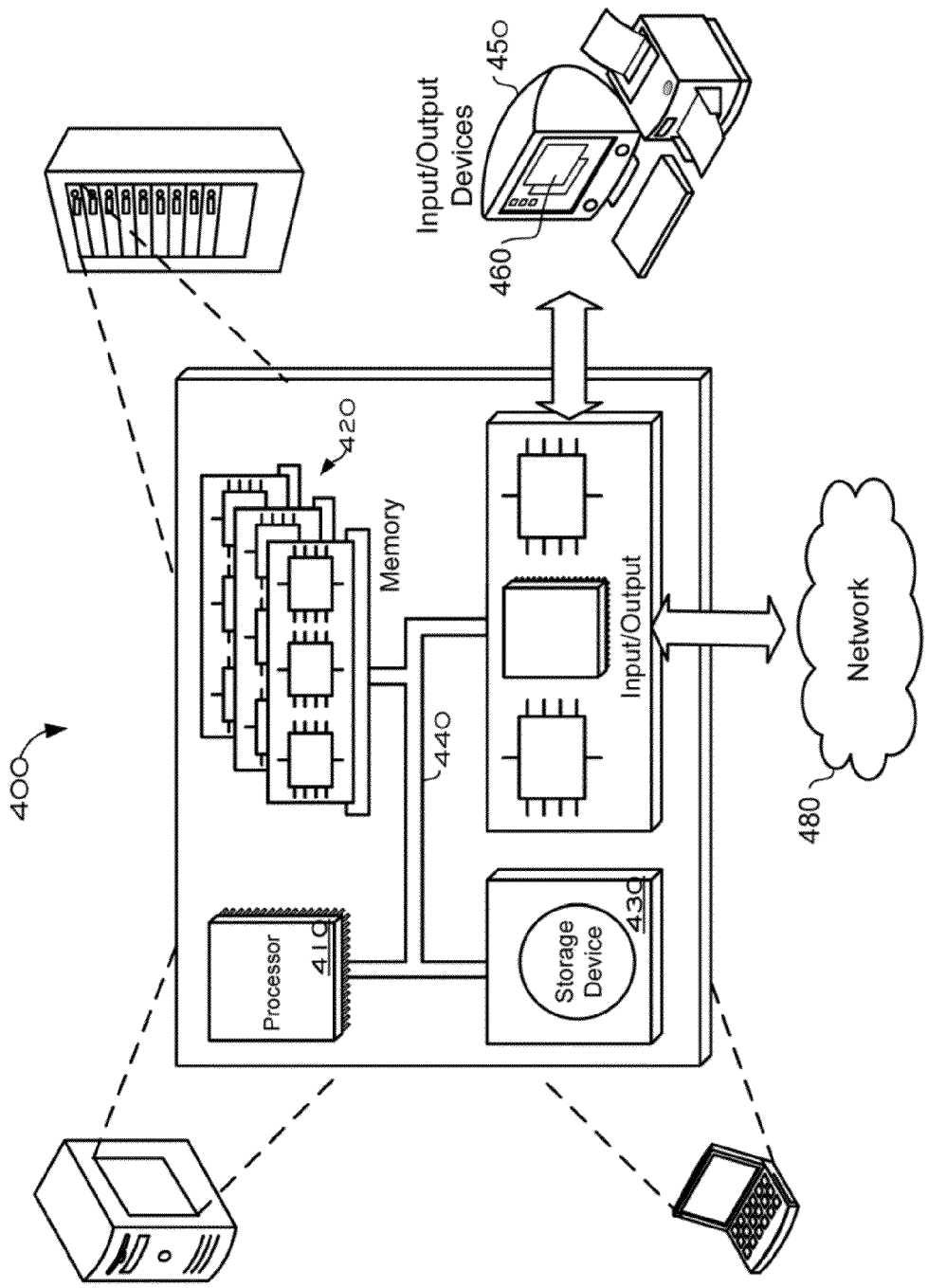

CONTENT LAYOUT FOR AN ELECTRONIC DOCUMENT

BACKGROUND

This specification relates to calculating layout parameters for content items of an electronic document. In conventional systems, a web page is received over the Internet and interpreted by a web browser. The web browser generates a graphical representation of the web page based in part on parameters of the web page and parameters of the web page content items. The web page can be converted to a different type of electronic document, for example, a Portable Document File (PDF) format. For example, ADOBE® ACROBAT® Software (available from Adobe Systems Incorporated of San Jose, Calif.) allows a user to convert a web page to a PDF document. As another example, "plug-in" applications available for some web browser applications generate PDF documents based on web pages. As a particular example, some versions of INTERNET EXPLORER® (e.g., versions 6, 7, and 8) include a "webcapture" plug-in application that converts a web page to a PDF document.

In some cases, the entire web page, including all of the web page content items, is converted to a PDF version of the web page. In other cases, a user can designate one or more content items to be omitted from the PDF version of the web page, or a user can designate one or more content items to be the only content items included in the PDF version of the web page. The PDF version of the web page can then be generated based on the parameters used by the web browser (i.e., values specified in the HTML or CSS document) to generate a graphical representation of the web page.

SUMMARY

This specification describes technologies relating to determining layout parameters for content items of an electronic document.

In general, one innovative aspect of the subject matter described in this specification can be embodied in methods that include the operation of receiving an identification of a subset of content items, which are identified in a first electronic document. The first electronic document includes data for generating a first graphical representation of multiple content items, including the subset of content items, based on initial values of layout properties for the multiple content items. Each content item in the subset of content items includes displayable data. A prioritization of the subset of content items is identified, and a first content item is selected based on the prioritization. A new value of a first layout property for the selected content item is calculated based at least in part on one or more of the initial values. A new electronic document is generated. The new electronic document includes an identification of the new value and data for generating a second graphical representation of the subset of content items based at least in part on the new value. Other embodiments of this aspect include corresponding systems, apparatus, and computer programs, configured to perform the actions of the methods, encoded on computer storage devices.

These and other embodiments can each optionally include one or more of the following features. The first layout property includes a size dimension, and the first content item appears larger in the second graphical representation than in the first graphical representation based on the new value of the size dimension for the first content item being greater than an initial value of the size dimension for the first content item. The second graphical representation defines less unused space than a graphical representation of the subset of content items generated based in part on an initial value of the first layout property for the first content item. The prioritization of the subset of content items is identified by identifying a two dimensional area of each content item in the subset and generating an ordered list of the content items according to an ordering of the identified areas. The first content item is selected based on the first content item having a higher priority level than other content items in the subset. Subsequent to calculating the new value for the first content item, a second content item of the subset is selected based on the prioritization. A new value of the first layout property for the second content item is calculated. The new electronic document includes an identification of the new value for the second content item, and the second graphical representation is based in part on the new value for the second content item. The first layout property is width. A first object in the first electronic document includes an identification of the first content item. The first object has a parent object in the first electronic document. The parent object has multiple subordinate objects, including the first object, in the first electronic document. The new value of the layout property for the first content item is calculated by identifying that the width for the first content item is less than the width for the parent object. Identifying that the width for the first content item is less than the width for the parent object includes identifying that a difference between the width for the parent object and the width for the first content item is greater than a threshold value. A group of content items is identified from the subset of content items. Each content item in the group is identified in one of the subordinate objects and vertically intersects the first content item in the first graphical representation. The new value of the layout property for the first content item is calculated based on a difference between the value of the width for the parent object and a value of a combined width for the group of content items. The first electronic document identifies a hierarchical structure including multiple objects that identify the multiple content items. The hierarchical structure includes a root object. A list of the subset of content items is generated based on the prioritization. Each content item on the list is sequentially selected. Each time a content item is selected, the hierarchical structure is traversed from an object associated with the selected content item to the root object to determine whether to calculate a new value of the first layout property for one or more parent objects of the object associated with the selected content item. The subset of content items includes an image content item and/or a text content item. The first electronic document is a web page, and the new electronic document is a final format document. The first electronic document and the new electronic document include an identification of a style sheet. The style sheet includes attribute data for generating graphical representations. The new electronic document includes an inline style attribute that includes the identification of the new value. Calculating a new value of a first layout property for the selected content item includes calculating a new value of the layout property for an object in the first electronic document. The operations are implemented by a computer program encoded on a computer readable storage medium. The computer program is a plug-in application for a web browser or a plug-in application for a wireless application protocol browser. The computer program is a software application that operates independent of a web browser application. The operations are implemented by one or more data processors. The data processors are included in a personal computer running a web browser and/or a mobile device running a wireless application protocol browser.

Particular embodiments of the subject matter described in this specification can be implemented so as to realize one or more of the following advantages. The new values of the layout properties may allocate more space in a graphical representation to higher priority content items and/or less space to lower priority content items. The new values of the layout properties may allow the subset of content items to be presented more efficiently and/or suitably in the graphical representation. For example, the new values of the layout properties may cause one or more of the selected content items to occupy space in the second graphical representation that would have otherwise been empty, for example, if the second graphical representation had been generated according to the initial values of the layout properties in the first electronic document. As another example, new values of the layout properties may cause one or more of the content items to be more visible and/or more readable in the second graphical representation. In some implementations, a new vertical position of one or more content items may be designated to allow a higher priority content item to occupy a greater amount of the page width in the second graphical representation. In some cases, new values of the layout properties cause the second graphical representation to occupy fewer pages. As such, viewing the second graphical representation on a display device (e.g., a mobile device, a monitor, or another display device) may require less scrolling. Also, in cases where the second graphical representation is stored as an image file and/or printed using a printing device, the new layout parameters may allow conservation of computing and/or printing resources (e.g., memory, processor time, paper, toner, ink, printing time, etc.).

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 2A, 2B, 2C and 2D show example graphical representations of electronic documents.

FIG. 4 is a diagram showing an example computing system.

Like reference numbers and designations in the various drawings indicate like elements.

DETAILED DESCRIPTION

Figure 1A:
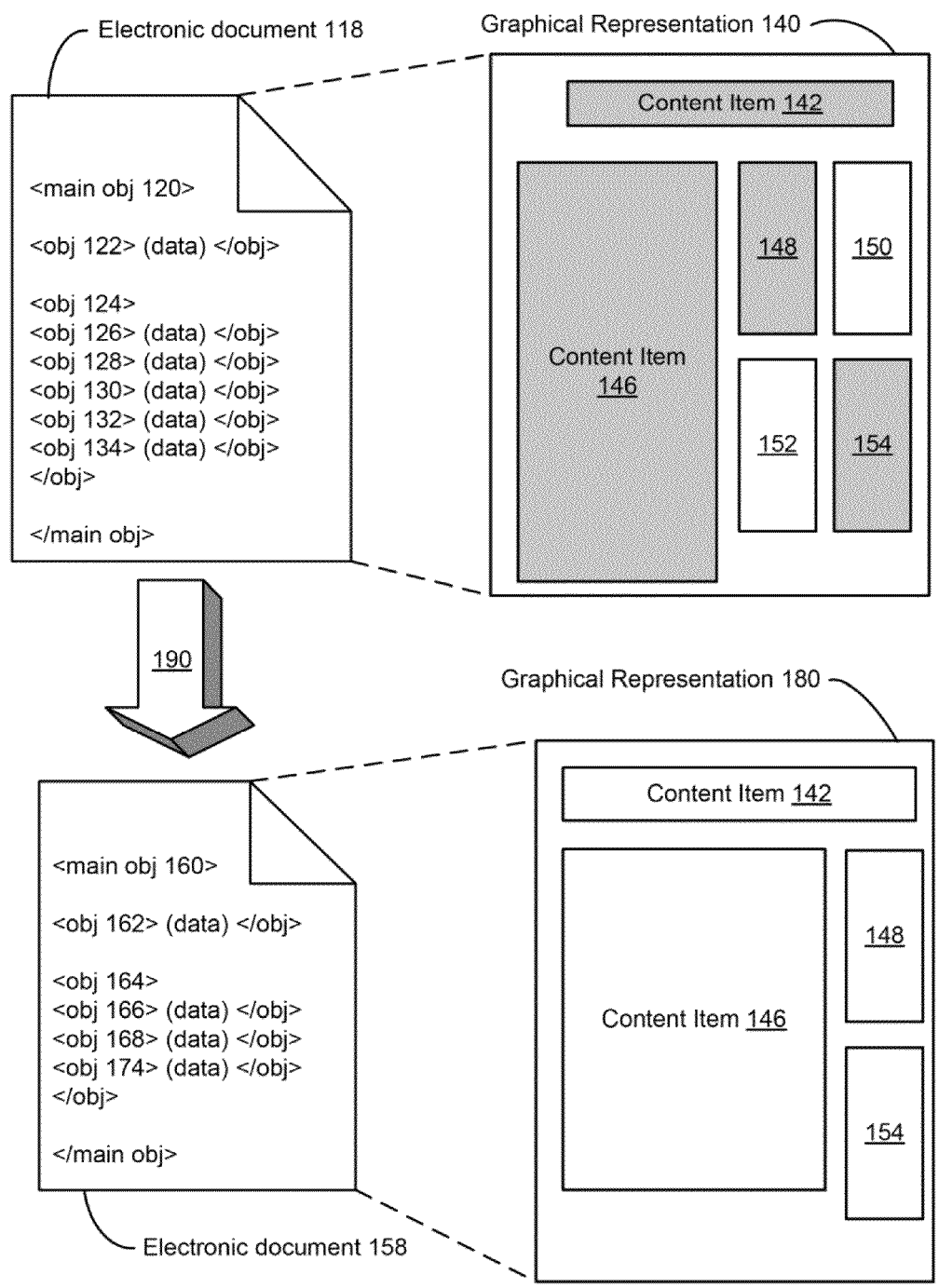
FIG. 1A is a diagram showing two example electronic documents and graphical representations of the example electronic documents.

FIG. 1A is a diagram showing a first graphical representation 140 of a first electronic document, and a second graphical representation 180 of a second electronic document 158. The first electronic document 118 includes an identification of multiple content items and an identification of initial layout parameters for presenting the multiple content items as shown in the first graphical representation 140. The second electronic document 158, which is generated based on the first electronic document 118, includes an identification of a selected subset of the content items and an identification of new layout parameters for presenting the selected subset of content items in a different layout, as shown in the second graphical representation 180. The new layout parameters in the second electronic document 158 are calculated based in part on a prioritization of the selected content items. For example, the new layout parameters may allocate more space in the second graphical representation 180 to higher priority content items and/or less space to lower priority content items. The new layout parameters may allow the selected content items to be presented more efficiently and/or suitably in the second graphical representation 180. For example, the new layout parameters may cause one or more of the content items to occupy space in the second graphical representation 180 that would have been empty, for example, if the second graphical representation 180 had been generated according to the initial layout parameters in the first electronic document 118. As another example, the new layout parameters may cause one or more of the content items to be presented in a manner that may be more readable and/or more understandable to a person viewing the second graphical representation 180. In some cases, the new layout parameters cause the second graphical representation 180 to occupy fewer pages. As such, in cases where the second graphical representation 180 is stored as an image file and/or printed using a printing device, the new layout parameters may allow conservation of computing and/or printing resources (e.g., memory, processor time, paper, toner, ink, printing time, and/or others).

An electronic document (also referred to herein as a "document") may, but need not, correspond to a file. A document may be stored in a portion of a file that holds other documents, in a single file dedicated to the document in question, or in multiple coordinated files. Example electronic documents include web pages, word processing documents, spreadsheets, final format documents, and others. Electronic documents contain data describing a particular graphical layout and/or a multimedia presentation of content information. For example, an electronic document may contain data that describes a particular graphical layout and/or multimedia presentation of text, image, video, audio, and/or other types of information. One or more software applications can be adapted to interpret electronic documents of various formats and to generate a graphical and/or multimedia representation according to the data contained in the document.

Web pages can include any type of code that can be interpreted by a web browser application and/or similar software applications. For example, a web page may include Hypertext Markup Language Code (HTML), Extensible Hypertext Markup Language Code (XHTML), JAVASCRIPT®, and/or others. A web page can incorporate layout parameters by reference to a style sheet, for example, a Cascading Style Sheet (CSS) and/or another type of style sheet. In some implementations, a web page includes an inline style sheet value for an attribute (e.g., <div style='width:100px'>, and/or another type of inline style sheet value) that overrides a value for the same attribute in an associated CSS document. A final format document provides a device-independent format for publishing and/or distributing electronic documents. An example of a final format is the Portable Document Format (PDF) available from Adobe Systems Incorporated of San Jose, Calif. Example software for creating and reading PDF documents is ADOBE® ACROBAT® software, also of Adobe Systems Incorporated. In this specification, examples are described where a PDF document is generated based on a web page document. However, the underlying principles, techniques, and systems disclosed can be applied beyond the specific examples provided. For example, the techniques described herein can be used to generate a new electronic document of any format based on an initial electronic document of the same format or a different format.

As shown in FIG. 1A, the first electronic document 118 includes a main object 120 and multiple subordinate objects 122, 124, 126, 128, 130, 132, and 134. Each of the objects shown in FIG. 1A includes additional data that is not shown in the diagram for purposes of clarity. Each of the objects can correspond, for example, to an element of an HTML document. The objects may include displayable objects and non-displayable objects. The displayable objects can include text objects, image objects, video objects, and/or others.

Figure 1B:
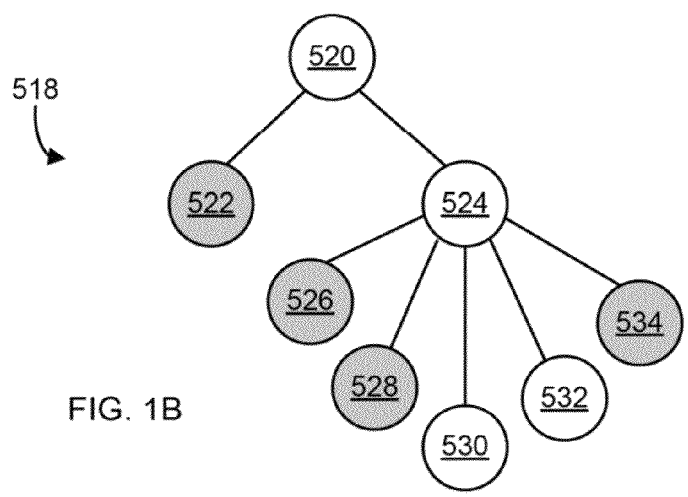
FIG. 1B is a block diagram showing an example of a hierarchical structure of objects in an electronic document.

The first electronic document 118 defines a hierarchical structure of the objects. For example, a diagram illustrating the hierarchical structure of the first electronic document 118 is shown in FIG. 1B, which is discussed in more detail below. The main object 120 may define one or more properties of the first graphical representation 140 as a whole (e.g., background color, font size, font style, etc.). For example, the main object can be designated in the first electronic document 118 by the "<body> ... </body>" HTML tags, or in a different manner. The main object 120 is a parent object of the subordinate objects 122, 124, 126, 128, 130, 132, and 134. Each of the subordinate objects 122, 124, 126, 128, 130, 132, and 134 includes data pertaining to one or more of the content items in the first graphical representation 140. The main object and/or the subordinate objects can include initial values of layout properties for each of the content items in the graphical representation. For example, one or more of the objects may specify a particular value of a height, width, or position of a content item. As another example, the first electronic document 118 may include an initial value of a layout property by incorporating the initial value from a style sheet or a similar document. The value of a layout property can be a relative quantity. For example, the width of a first content item may be specified as a percentage of the width of another content item, as a percentage of the width of a parent object, as a percentage of a page width, or in another manner using a relative value. The values of a layout property can be an absolute quantity. For example, the value of a width can be specified in inches, centimeters, pixels, or another type of absolute quantity.

The object 122 includes data pertaining to the content item 142. For example, if the content item 142 is a heading, the object 122 can be designated by the "<h1> ... </h1>" HTML tags and can include data specifying the text and the attributes of the heading. The data specifying the text of the heading can include the actual text characters of the heading, a reference to the text characters of the heading, and/or other data. The data specifying attributes of the heading can indicate a position, size, style, and/or other properties of the heading.

The object 126 includes data pertaining to the content item 146. For example, if the content item 146 is a text paragraph, the object 126 can be designated by the HTML "<p> ... </p>" tags and can include data specifying the text and attributes of the paragraph. The data specifying the text of the paragraph can include the actual text characters of the paragraph, a reference to the text characters of the paragraph (e.g., a path and/or file name specifying a file that includes the full text of the paragraph), and/or other data. The data specifying attributes of the paragraph can indicate a position, size, style, and/or other properties of the paragraph.

The object 128 includes data pertaining to the content item 148. For example, if the content item 148 is an image, the object 128 can be designated by the "<img>" HTML tag and can include data specifying the image and attributes of the image. The data specifying the image can include the actual image data, a reference to the image data (e.g., a path and file name specifying where the image is stored), and/or other data. The data specifying attributes of the image can indicate a position, size, orientation, and/or other properties of the image. Similarly, the objects 130, 132, and 134 include data pertaining to the content items 150, 152, and 154, respectively.

The object 124 includes data pertaining to one or more of the content items 146, 148, 150, 152, and 154. For example, the object 124 can be a table (e.g., designated by the "<table> ... </table>" HTML tags), a row or column of a table, a list, or another type of object. In the case of a table, the object 124 can include data specifying attributes of the table and/or attributes of the content items 146, 148, 150, 152, and 154, including data specifying how the content items are arranged with respect to one another in the first graphical representation 140.

The first graphical representation 140 presents multiple content items 142, 146, 148, 150, 152, and 154 according to the data included in the first electronic document 118. For example, in an example where the first electronic document 118 is a web page, a web browser can interpret the first electronic document 118 to generate the first graphical representation 140. The spatial layout of the content items in the first graphical representation 140 can be based on properties specified by values included in the first electronic document 118, by values included in a style sheet or a similar document, by values derived from the properties of the content items, and/or other values. For example, the width of the content item 146 in the first graphical representation 140 may be specified by a value of the "width" attribute in the text object 126, by a value of the "width" attribute in the parent object 124, by a value included in a CSS document, and/or in another manner. As another example, the width of the image content item 148 in the first graphical representation 140 may be specified by the width in pixels of the source image. Alternatively, the width of the image content item 148 may be specified by a value of the "width" attribute in the image object 128, by a value of the "width" attribute in the parent object 124, by a value of the "width" attribute included in a CSS document, and/or in another manner.

The second electronic document 158 includes data for generating a graphical representation of the selected subset of content items 142, 146, 148, and 154 (i.e., the content items highlighted in the first graphical representation 140). In particular, the second electronic document 158 includes new values of layout properties for one or more of the selected subset of content items 142, 146, 148, and 154. The second electronic document 158 may be generated by data processing apparatus that generates new data by executing instructions stored on a computer readable medium. For example, the second electronic document 158 can be generated by a process and/or using a system that includes any of the features described with respect to FIGS. 2A-2D and 3A-3C below. The second electronic document 158 is generated based on all or part of the first electronic document 118 and other data. For example, the second electronic document 158 may be generated by creating a prioritized list of the selected content items 142, 146, 148, and 154 and calculating new layout properties of the content items based at least in part on the prioritization.

In some cases, the second electronic document 158 is generated based in part on data received through a user interface device. For example, a user may use a pointing device, a touchpad, keyboard, and/or another device to designate the selected subset of content items 142, 146, 148, and 154, and the user may input a request to generate a new electronic document that includes only the selected content items 142, 146, 148, and 154. As another example, a user may designate the non-selected content items 150 and 152 and input a request to generate a new electronic document that does not include the non-selected content items 150 and 154.

The second electronic document 158 includes a main object 160 and multiple subordinate objects 162, 164, 166, 168, and 174. Each of the objects can be formatted, for example, as an object of a PDF document. In some cases, one or more objects in the second electronic document 158 corresponds to one or more of the objects in the first electronic document 118 (e.g., object 162 can correspond to object 122). In other cases, there is no correspondence between the objects in the two documents. As in the first electronic document 118, the objects in the second electronic document 158 may include displayable objects and non-displayable objects. The objects in the second electronic document 158 may include identifications of additional content items not included in the first electronic documents 118. The main object 160 may define one or more properties of the graphical representation 180 as a whole (e.g., page size, bounding box, font size, font style, etc.). The main object 160 is a parent object of the subordinate objects 162, 164, 166, 168, and 174.

Each of the subordinate objects 162, 164, 166, 168, and 174 includes data pertaining to one or more of the content items in the second graphical representation 180. Each of the subordinate objects may include text and/or image data for a content item shown in the second graphical representation 180. Each of the subordinate objects may also include attribute data for a content item shown in the second graphical representation 180. For example, the attribute data may include a value of a height for a content item, a value of a width for a content item, values of coordinates specifying a position for a content item, a value of an orientation for a content item, values specifying a bounding box for a content item, and/or other data.

The second graphical representation 180 presents the selected subset of content items 142, 146, 148, and 154 according to the data in the second electronic document 158. The spatial layout of the content items in the second graphical representation 180 can be based on properties specified by values included in the second electronic document 158, by values included in a style sheet or a similar document, by values derived from the properties of the content items, and/or other values. For example, the new width of the content item 146 in the second graphical representation 180 may be specified by a new value of the "width" attribute in text object 166, by a new value of the "width" attribute in the parent object 164, by a new inline style sheet value in the object 166, and/or in another manner. In some cases, when a new value of a layout property is incorporated in the second electronic document 158 as an inline style sheet value, the inline style sheet value overrides a value of the layout property designated by a style sheet document incorporated by reference in the second electronic document 158.

The attribute data in the second electronic document 158 specifies a different layout of the content items 142, 146, 148 and 154 than the attribute data in the first electronic document 118. Thus, the content items 142, 146, 148 and 154 have a different layout in the second graphical representation 180: the content item 146, which has the largest area in the first graphical representation 140, is wider in the second graphical representation 180 than in the first graphical representation 140; the content items 148 and 154, which vertically intersect the content item 146, have the same width in both graphical representations 140 and 180; the content item 142, which does not vertically intersect the content item 146, is wider in the second graphical representation 180 than in the first graphical representation 140. Two content items vertically intersect when they have overlapping domains in a vertical dimension of the graphical representation. That is to say, two content items vertically intersect if the two content items overlap when projected on a vertical axis. For example, in the graphical representation 140, the content item 146 vertically intersects the content items 148, 150, 152, and 154, but the content item 146 does not vertically intersect the content item 142.

In the example shown in FIG. 1A, new values are calculated for the width of the content items 142 and 146. However, in other examples, new values of different and/or additional layout properties are calculated. For example, in some cases a new value of the height, a new value of one or more position coordinates, a new value of an orientation, and/or a new value of another property is calculated for one or more content items. In some implementations, a new value is calculated for only one dimension (e.g., width) of a content item. In some implementations, a new value is calculated for two dimensions of a content item, for example, to maintain or approximately maintain an initial aspect ratio of the content item. The decision to maintain an initial aspect ratio of a content item can be made based on the type of content item. For example, in some cases it may be beneficial to maintain an aspect ratio of a graphic object or certain types of graphic objects.

In the example shown in FIG. 1A, the content item 146 includes text content, and generating the graphical representation of the content item 146 based on a larger width value causes the content item 146 to have a shorter height (as shown in the graphical representation 180), since text wrapping in the content item causes the text characters to require fewer lines of text. However, in some cases, generating a graphical representation of a content item 146 based on a larger value of the width does not cause the content item 146 to have a shorter height. For example, in some cases, the larger value of the width of a content item has no effect on the height of the content item.

FIG. 1B shows an example diagram 518 of the hierarchical structure defined by the first electronic document 118 in FIG. 1A. The example diagram 518 includes multiple nodes 520, 522, 524, 526, 528, 530, 532, and 534. Each node represents an object in the first electronic document 118. Node 520 is a root node that represents the main object 120. The other subordinate nodes 522, 524, 526, 528, 530, 532, and 534 represent the subordinate objects 122, 124, 126, 128, 130, 132, and 134, respectively. Thus, the highlighted nodes 522, 526, 528, and 534 represent the objects associated with the selected subset of content items in the first graphical representation 140.

Figure 1C:
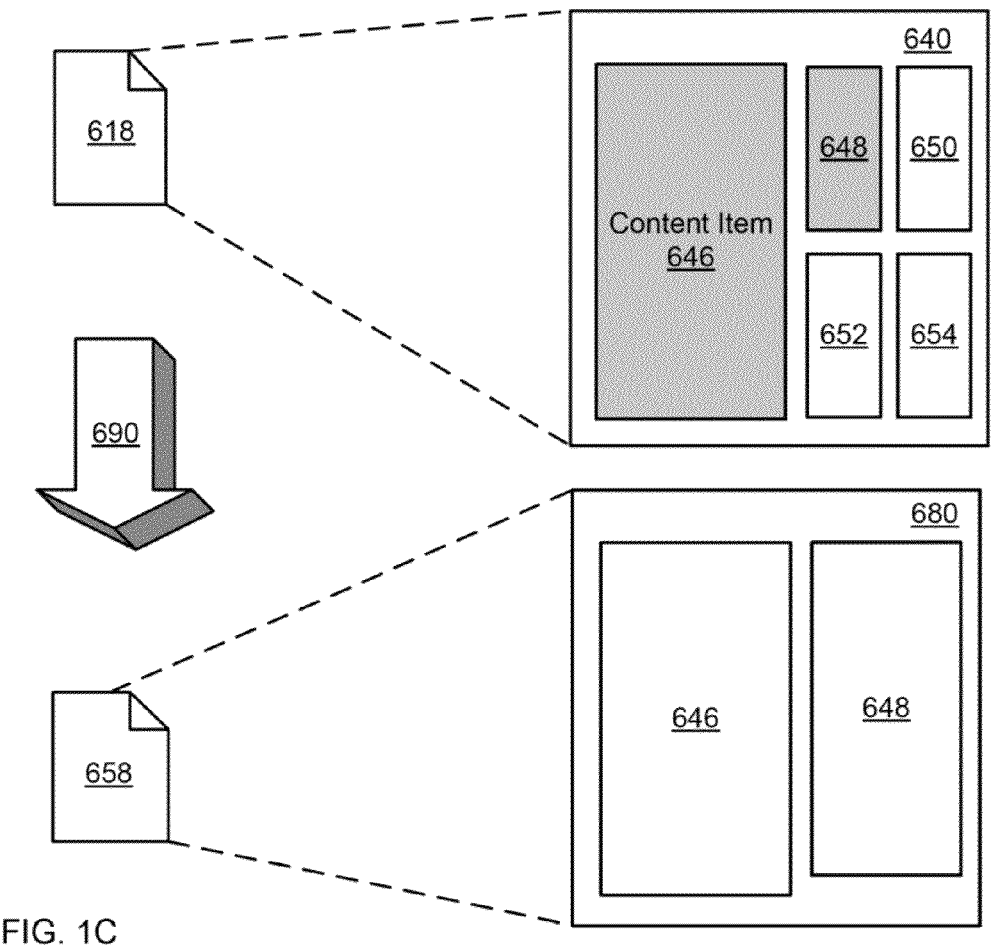
FIG. 1C is a diagram showing two example electronic documents and graphical representations of the example electronic documents.

FIG. 1C shows another example of a first graphical representation 640 of a first electronic document 618, and a second graphical representation 680 of a second electronic document 658. The first electronic document 618 includes an identification of multiple content items (646, 648, 650, 652, and 654) and an identification of initial layout parameters for presenting the multiple content items as shown in the first graphical representation 640. The second electronic document 658, which is generated based on the first electronic document 618 by a process 690, includes an identification of a selected subset of the content items (646 and 648) and an identification of new layout parameters for presenting the selected subset of content items (646 and 648) in a different layout, as shown in the second graphical representation 680. The process 690 calculates new values of layout properties for one or more of the content items 646 and 648 based at least in part on a prioritization of the content items 646 and 648. For example, the content item 648 may have a higher priority level than the content item 646 based on a position, size, content type, and/or a user selection associated with the content items 646 and/or 648.

The attribute data in the second electronic document 658 specifies a different layout of the content items 646 and 648 than the attribute data in the first electronic document 618. In particular, the content item 648 appears larger in proportion to the content item 646 in the second graphical representation 680 than in the first graphical representation 640. Also, the aspect ratio of the content item 648 is the same in both the first graphical representation 640 and the second graphical representation 680. In some implementations, such a result is accomplished by specifying new values for both the height and width in the second electronic document 658.

In other examples, new values of layout properties are calculated for both content items 646 and 648, based at least in part on a prioritization of the content items 646 and 648. In some implementations, new values of the width and/or height for both content items 646 and 648 can be calculated. In an example where the content item 646 has a higher priority than the content item 648, the width and/or height of the higher priority content item 646 can increased by a first amount (e.g., 10 percent, 20 percent, or a different amount) with respect to the initial properties of the content item 646, and the width and/or height of the lower priority content item 648 can increased by a second amount (e.g., 2 percent, 5 percent, or a different amount) with respect to the initial properties of the content item 648.

FIGS. 2A, 2B, 2C and 2D show example graphical representations of electronic documents. FIG. 2A shows an example of a graphical representation 200 of a web page. The graphical representation 200 can be generated by a web browser application based on a web page received from a remote server, and the graphical representation 200 can be displayed to a user on a display device. Example web browser applications include INTERNET EXPLORER®, developed by Microsoft Corporation of Redmond, Wash., MOZILLA FIREFOX® developed by Mozilla Foundation of Mountain View, Calif., and other web browser applications. The graphical representation 200 includes multiple content items. For example, the graphical representation 200 includes a banner image item 202, a first headline text item 204, a second headline text item 206, a dateline text item 208, a paragraph-style text item 210*a*, a first advertisement image item 212, a second advertisement image item 214, and other content items.

In some cases, the web page can be received by a handheld mobile device, such as a mobile telephone, and the graphical representation 200 can be generated by a web application protocol (WAP) running on the mobile device. The web application protocol can provide some or all of the functionality of a web browser and generate graphical representations of web pages based in part on parameters and/or restrictions of the mobile device.

The web page can be converted to a PDF document or another type of electronic document. In some cases, the web browser includes a tool or a "plug-in" application that generates the PDF document based on the web page and user input data. In other cases, a separate application, other than the web browser application or a plug-in application, can convert the web page to a PDF document or a different type of document. For example, in some cases, a separate software application converts a web page into a POSTSCRIPT® format.

The software application or tool that generates the PDF document based on the web page may allow a user to select a subset of the content items in the web page to be included in the PDF document. In some implementations, the software application that generates the PDF document automatically selects the subset of content items. For example, a content item may be selected automatically based on the number of pages the content item occupies, the area of the content item, the height of the content item, the width of the content item, and/or another property. The software application or tool that generates the PDF document based on the web page may allow a user to designate a relative priority level of one or more of the content items in the web page. For example, the software application may allow the user to select a primary content item (i.e., a highest priority item), and/or the software application may allow the user to designate a different priority level for each content item in the selected subset. In some implementations, the software application that generates the PDF document automatically identifies a prioritization for the subset of content items, for example, based on the size and/or positions of the content items. For example, the prioritization may be identified automatically based on one or more of a height, width, area, vertical coordinate, horizontal coordinate, or another property of a content item.

Based on the example graphical representation 200 shown in FIG. 2A, a subset of the content items shown in the graphical representation 200 are selected for conversion to PDF. For example, a user of a web browser may use a pointing device to select the subset of content items by drawing a bounding box around each of the content items that the user wants to select. The selected subset includes the content items 204, 206, and 210*a*. A PDF document that includes new values of layout properties for the subset of content items can be generated based on the web page. For purposes of illustration, graphical representations of two example PDF documents are shown in FIGS. 2B, 2C, and 2D. A first example PDF document (represented in FIG. 2B) includes new values of layout properties, and a second example PDF document (represented in FIGS. 2C and 2D) does not include new values of the layout properties.

The first example PDF document, represented in FIG. 2B, includes one or more new values for layout properties of the content items. Accordingly, as shown in FIG. 2B, the content items in the graphical representation 220 of the first example PDF document have a different spatial layout than the content items in the graphical representation 200 of the web page shown in FIG. 2A. For example, the paragraph-style text item 210*b* is wider in the graphical representation 220 than the paragraph-style text item 210*a* in the graphical representation 200. The greater width of the content item 210*b* allows the content item 210*b* to occupy regions in the graphical representation 220 that would have been empty (i.e., unused) if the content item had instead been presented with the initial width of the content item 210*a*. Thus, the greater width of the content item 210*b* allows the content item 210*b* to occupy regions in the graphical representation 220 that would have been allocated to the advertisement image items 212 and 214 if advertisement image items 212 and 214 had been selected to be included in the PDF document. As shown in FIG. 2A, the first example PDF document occupies one page.

By contrast, a second example PDF document, represented in FIGS. 2C and 2D, does not include the new value of the width for the paragraph-style text item. As a result, a graphical representation (230*a* and 230*b*) of the second example PDF document extends over two pages, as shown in FIGS. 2C and 2D. The graphical representation (230a and 230b) of the second example PDF is generated based on the initial values of layout properties of the web page content items, that is to say, the parameters used by the web browser to generate the graphical representation 200 in FIG. 2A. Thus, in the example shown, the graphical representation 230a and 230b includes more unused, empty space than the graphical representation 220. In some cases, unused space appears in a graphical representation of an electronic document as a uniform color or pattern of colors, such as a background with no content items overlaying the background. Thus, in some cases, unused space in a graphical representation refers to regions of a graphical representation where no foreground objects are presented. In some cases, unused space in a graphical representation includes regions of a graphical representation that reside outside of a bounding box of any content item (but within a bounding box of the page or presentation space).

Figure 3A:
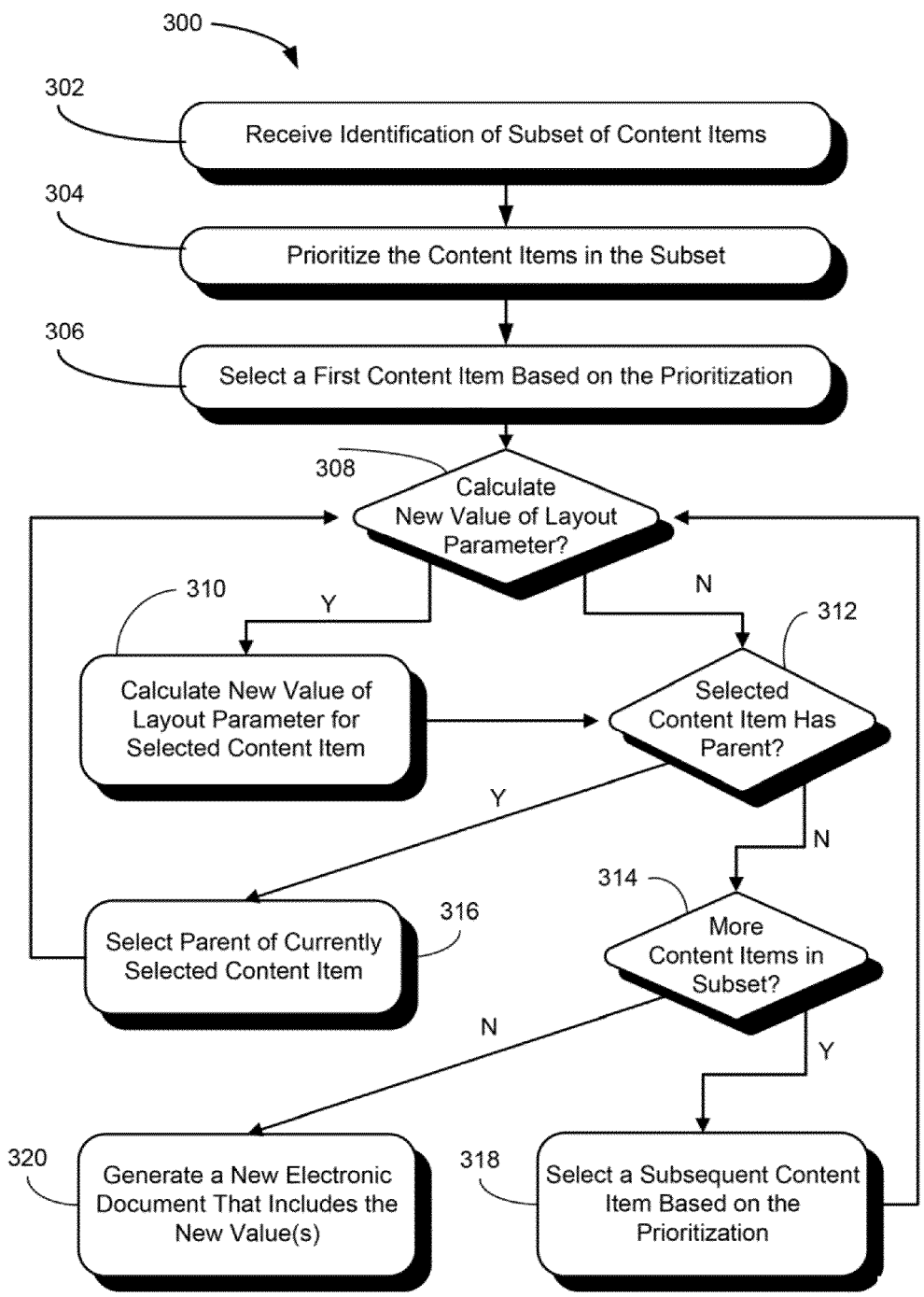
FIG. 3A is a flow chart showing an example process for generating an electronic document.

FIG. 3A is a flow chart showing an example process 300 for generating an electronic document. For example, the process 300 can be used to generate a new electronic document based at least in part on an initial electronic document. For example, the process 300 can be used to implement the document generating step 190 in FIG. 1A, to implement the document generating step 690 in FIG. 1C, and/or to generate the graphical representation 220 represented in FIG. 2B. The process 300 is a computer-implemented process. For example, the operations of the process 300 can be performed by executing instructions on a data processing apparatus.

At 302, an identification of a subset of content items is received. The identified subset of content items includes one or more of multiple content items identified in a first electronic document. The first electronic document includes data for generating a first graphical representation of the multiple content items based at least in part on initial values of layout properties for the multiple content items. Each content item in the subset of content items includes displayable data, such as image or text data. The identification of the subset of content items can be received based on data input by a user. For example a user may designate the subset of content items by interactions with a graphical user interface presented by a web browser. The identification of the subset of content items can be generated automatically, for example, based on the form or content of the content items. As a particular example, all of the text content of an electronic document may be automatically designated.

At 304, the content items in the identified subset are prioritized. That is to say, a prioritization of the content items is identified. An algorithm for identifying a prioritization of content items can include multiple operations. For example, the prioritization can be identified by first, identifying an area (and/or another property) of each content item in the subset and second, sorting the content items according to area (and/or the other identified property). In such a case, the content items with the largest area may, for example, be given highest priority. The area can be identified, for example, based on a bounding box of the content item or other data. Prioritizing the content items can include generating an ordered list of the content items, for example, according to the identified areas. The list can be stored as a data structure in memory. Identifying the prioritization of the subset of content items can include receiving data based on a user interaction, where the user interaction indicates one or more content items as having a higher or lower priority than other content items. Identifying the prioritization of the subset of content items can include a combination of sorting the content items by area and other techniques, such as receiving input from a user. For example, a user may designate one or more highest priority content items in the subset, and the remaining content items in the subset (those not designated by the user) can be sorted based on area. As another example, if two or more content items in the subset have equal or substantially equal areas, a particular content item of the two or more content items may be given higher priority than the others based on a position or content of the particular content item.

At 306, a first content item of the subset is selected based on the prioritization. An algorithm for selecting a first content item can include one or more operations. For example, selecting a first content item of the subset can include selecting the first content item based on the first content item having a higher priority level than other content items in the subset of content items. In some cases, selecting the first content item may also include selecting multiple content items and/or determining whether to select multiple content items.

In some implementations, operations 308, 310, 312, 314, 316, and 318 represent an iterative technique for calculating new values of layout properties for content items in an electronic document. In some implementations, the iterative technique is used to traverse a prioritized list of the subset of content items (e.g., a prioritized list generated at 304). The iterative technique described with respect to operations 308, 310, 312, 314, 316, and 318 can be implemented to sequentially select each content item on the prioritized list, where each time a content item on the prioritized list is selected, a hierarchical structure defined by the electronic document is traversed to determine whether a new value of a layout property of any parent objects should be calculated. As described with regard to FIGS. 1A and 1B, each content item in the subset of content items is associated with one or more data objects in a hierarchical structure defined by the first electronic document. As described in more detail below with regard to operations 308, 310, 312, 314, 316, and 318, each time a content item on the prioritized list is selected, the hierarchical structure defined by the first electronic document is traversed from an object associated with the selected content item to a root object of the document to determine whether to calculate a new value of a layout property for one or more parent objects of the object associated with the selected content item.

At 308, a determination is made whether to calculate a new value of a layout property of the selected content item. In some implementations, the layout property is a width of the selected content item. The determination as to whether to calculate a new value of a layout parameter can be based on whether calculating a new value would reduce an amount of empty space in one or more regions in a graphical representation of the selected content items. The determination can be made by comparing the dimensions of two or more of the content items in the subset, by comparing the dimensions of one or more content items to a page width, and or by another technique. For example, the determination can be made by performing multiple operations according to the process 328 shown in FIG. 3B, and/or according to another process. The determination as to whether to calculate a new value of a layout property can be based on the content, format and/or type of the selected content item. In some implementations, a new value of the layout property is not calculated for content items of a certain data format or content type. For example, in implementations where calculating a new value of a layout property would change the aspect ratio of the content item, a determination not to calculate a new value of the layout property may be based on the content item including image and/or video data.

If, at 308, it is determined that a new value of a layout parameter is to be calculated for the selected content item, the new value is calculated at 310. For example, a new value of a width, height, position, area, or another property can be calculated for the selected text or image content item. An algorithm for calculating a new value of the layout property can include multiple operations, such as the operations of the process 338 of FIG. 3C and/or additional or different operations. After a new value of a layout property is calculated for a content item at 310, it may be necessary or desirable to additionally calculate a new value of a layout property of a parent object. For example, if a new value of the width of the selected content item is larger than the initial value of the width of the selected content item, a new value of the width of a parent object may need to be calculated in order to prevent clipping (i.e., truncation) of the selected content item in a graphical representation.

After a new value is calculated at 310 (or alternatively, after it is determined at 308 that a new value of a layout parameter is not to be calculated for the selected content item), then it is determined at 312 whether an object associated with the selected content item has a parent object. For example, the associated object may include an identification of the selected content item, and the parent object can be identified according to a hierarchical structure defined in the first electronic document.

If a parent object is identified at 312, the parent object is selected at 316, and it is then determined at 308 whether to calculate a new value of a layout property for the newly selected (parent) object. One or more of the subsequent operations 310, 312, 316 are then executed with respect to the newly selected (parent) object. As one example, the parent object may be a table element, and a new value for a width of the table element may then be calculated at 310. In this example, after calculating a new width of the table element at 310, it is determined at 312 whether the currently selected table element has a parent object. If the table element has a parent object, then the table element's parent object is selected at 316, and the process returns to 308 to determine whether to calculate a new value of the width for the parent object of the table element.

Accordingly, by iterating the subset of operations 308, 310, 312, and 316, the hierarchical structure of the first electronic document can be traversed from the selected content item to a root object to calculate new values for layout properties of all or some of the selected content item's parent objects. In some cases, a new width of some or all of the parent object may be designated using an "auto" value that automatically accommodates the widths of all of the parent object's children.

If a parent object is not identified at 312, it is then determined at 314 whether there are additional content items for which a new value of a layout property may need to be calculated. For example, if a prioritized list of the content items is generated at 304, the determination at 314 may be made based at least in part on whether there are any remaining items on the prioritized list. For example, the determination may be made by attempting to increment a pointer or an index value to indicate a next content item in the prioritized list.

If an additional content item is identified at 314, the additional content item is selected at 318. If multiple additional content items are identified at 314, one or more of the additional content items are selected based on the prioritization identified at 304 and/or a different prioritization. The process then returns to 308 to determine whether to calculate a new value of a layout property for the newly selected content item.

If no additional content items are identified at 314, then a new electronic document is generated at 320. The new electronic document includes the one or more new values calculated at 310. The new electronic document includes data for generating a second graphical representation of the subset of content items based at least in part on the new value(s). As a result of the new electronic document including new values for the layout properties, the subset of content items have a different spatial layout in the graphical representation of the second electronic document than they have in the graphical representation of the first electronic document. For example, when the layout property is a size dimension (e.g., height, width, or another size dimension), the first content item may appear larger in the second graphical representation than in the first graphical representation based on the new value of the size dimension for the first content item being greater than an initial value of the size dimension for the first content item. As another example, generating the second graphical representation of the subset of content items based at least in part on the new value(s) may result in the second graphical representation containing less empty space.

Figure 3B:
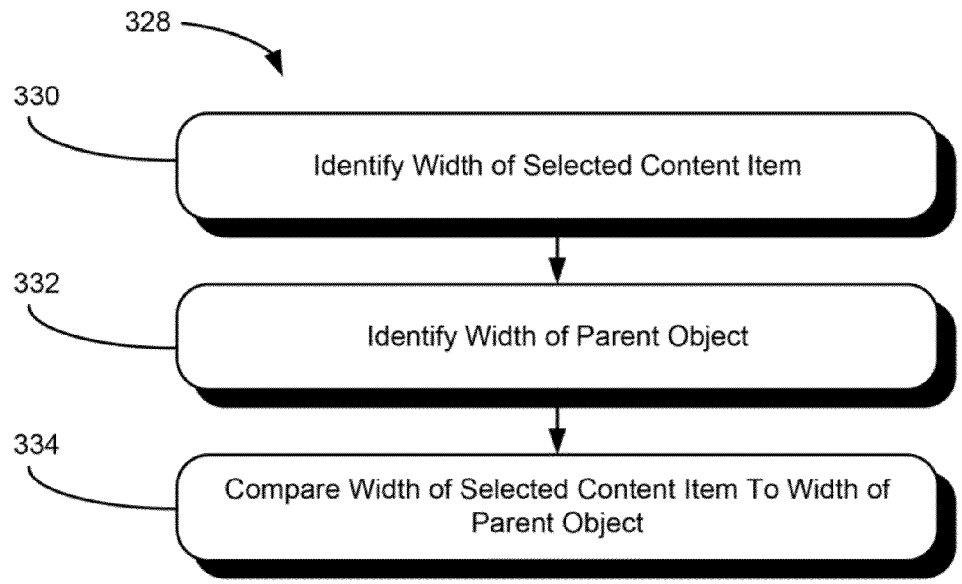
FIG. 3B is a flow chart showing an example process for determining whether to calculate a new value of a layout property for a content item.

FIG. 3B is a flow chart showing an example process 328 for determining whether to calculate a new value of a layout property for a selected content item. For example, the process 328 can be used to implement the operation 308 of the process 300 shown in FIG. 3A. The process 328 is a computer-implemented process. For example, the operations of the process 328 can be performed by executing instructions on a data processing apparatus.

In the example process 328, the layout property is the width of the content item. Other layout properties can also be used. At 330, a width of the selected content item is identified based on data included in an initial electronic document. The selected content item is associated with a first object in the initial electronic document (e.g., the first object contains the content item or an identification of the content item), and the first object has a parent object according to a hierarchical structure defined by the initial electronic document. At 332, a width of the parent object is identified.

At 334, the width of the parent object is compared to the width of the selected content item, which determines whether to calculate a new value of the width for the selected content item. In some cases, if the width of the parent object exceeds the width of the selected content item, it is determined that a new value of the width should be calculated for the selected content item. In some cases, if the width of the parent object exceeds the width of the selected content item by some threshold amount (e.g., 100 pixels, 150 pixels, 1 cm, or another amount), it is determined that a new value of the width should be calculated for the selected content item. For example, the new value of the width of the content item can be one hundred percent (or another percent) of the width of the parent object. In cases where it is determined at 334 to calculate a new value of the width, the process can then proceed to a subsequent operation, such as the operation 310 of FIG. 3A, the operation 342 of FIG. 3B, and/or another type of operation. In cases where it is determined at 334 not to calculate a new value of the width, the process can proceed to a different subsequent operation, such as operation 312 of FIG. 3A or another operation.

The process 328 is an example technique. Alternative techniques that include different and/or additional operations can be used to determine whether to calculate a new value of a layout property for a selected content item. For example, in some cases, the spatial domains of one or more content items in the subset can be determined (e.g., based on bounding boxes of the one or more content items). The domains of the content items can be compared to an overall page or presentation space domain to identify unused regions of a page or presentation space. In some cases, new values of layout properties can be calculated for those content items having a domain adjacent to the unused regions of the page or presentation space.

Figure 3C:
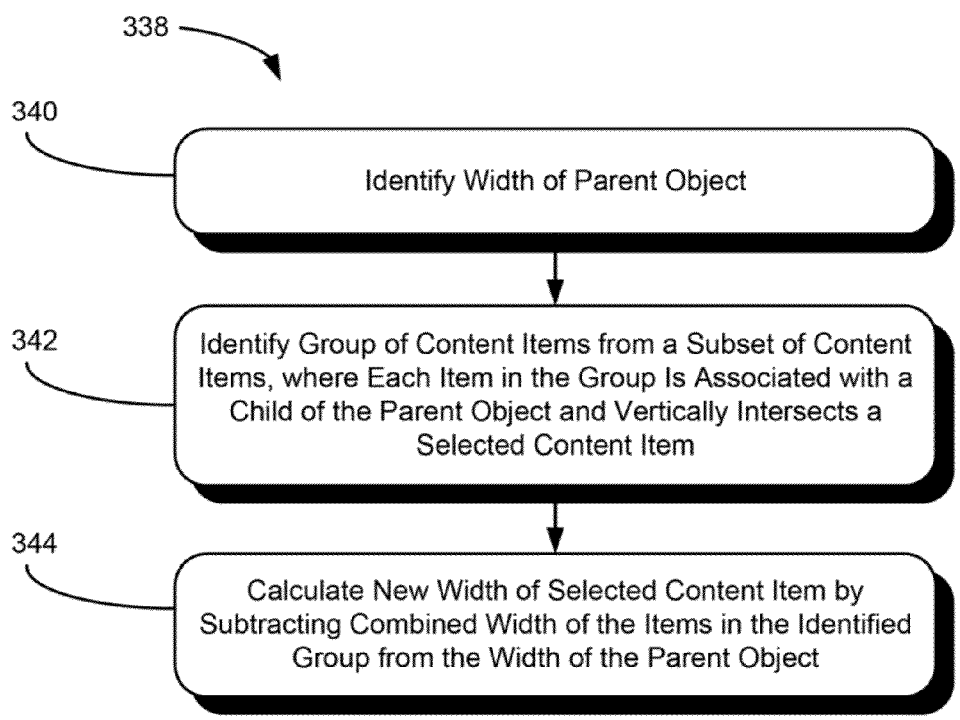
FIG. 3C is a flow chart showing an example process for calculating a new value of a layout property for a content item.

FIG. 3C is a flow chart showing an example process 338 for calculating a new value of a layout property for a selected content item. For example, the process 338 can be used to implement the operation 310 of the process 300 shown in FIG. 3A. The process 338 is a computer-implemented process. For example, the operations of the process 338 can be performed by executing instructions on a data processing apparatus.

In the example process 338, the layout property is the width of the content item. Other layout properties can also be used. The selected content item is one of the content items in a subset of the content items identified in an initial electronic document. The selected content item is associated with a first object in the initial electronic document, and the first object has a parent object according to a hierarchical structure defined by the initial electronic document. At 340, a width of the parent object is identified. At 342, a group of content items in the subset of content items is identified. Each content item in the identified group is associate with a child of the parent object and vertically intersects the selected content item. For example, each content item in the group may be associated with a different child object, or multiple content items in the group may be associated with the same child object. The group may include content items associated with some or all of the parent object's direct children, some or all of the parent object's children's children, etc. In some cases, the group may include a content item associated with any object below the parent object in the hierarchical structure and/or any object that vertically intersects the selected content item. At 344, a new width of the selected content item is identified by subtracting the combined width of the content items in the identified group from the width of the parent object. For example, a width of one or more of the content items in the identified group may be summed to calculate the combined width.

After the new width is calculated at 334, the process can proceed to a subsequent operation, for example, operation 312 of FIG. 3A or another operation. Thus, the process may proceed by traversing a hierarchical structure from an object associated with the selected content item to a root object, to determine whether new values of layout properties should be calculated for any parent objects. The new values for the parent objects may be calculated in order to accommodate a new size and/or position of the selected content item.

In some implementations, after a new width is calculated at 344, the process may proceed by calculating new values of layout properties for other objects in the group identified at 342. For example, a new position for one or more objects in the group may be calculated. In some cases, if the selected content item has much larger area than the area of another content item associated with an object in the group, then the smaller content item may be shifted vertically to accommodate a new width of the selected content item. As a particular example, if the smaller content has an area that is less than ten percent of the area of the selected content item, the smaller content item can be shifted vertically so that the selected content item can occupy the entire width of the page.

The process 338 is an example technique. Alternative techniques that include different and/or additional operations can be used to calculate a new value of a layout property for a selected content item. The identified group may additionally or alternatively include one or more objects that horizontally intersect the selected content item. (Two items horizontally intersect when the items have overlapping horizontal domains.) In such cases, a new value of the height of the selected content item additionally or alternatively be calculated. As another example, a new value of a layout property may be calculated by identifying spatial domains of one or more content items and determining an amount of unused space adjacent the selected content item.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

An example computer system is shown in FIG. 4, which is a block diagram of a programmable processing system (system) 400 suitable for implementing apparatus or performing methods of various aspects of the subject matter described in this specification. The example system 400 includes a processor 410, memory 420, a storage device 430, and one or more input/output devices 450. Each of the components 410, 420, 430, and 450 are interconnected using a system bus 440. The processor 410 is capable of processing instructions for execution within the system 400. In some implementation, the processor 410 is a single-threaded processor. In some implementations, the processor 410 is a multi-threaded processor. The processor 410 is capable of processing instructions stored in the memory 420 or on the storage device 430 to display graphical information for a user interface on the input/output devices 450. The processor 410 may execute software modules that implement the techniques described herein. For example, the processor 410 may execute one or more software modules for selecting a subset of content items, prioritizing a subset of content items, calculating new values of layout parameters for content items, generating electronic documents and graphical representations of electronic documents, and/or others.

The memory 420 is a computer readable medium such as volatile or non-volatile memory that stores information within the system 400. The memory 420 can store data structures representing files, electronic documents and other types of information. The storage device 430 is capable of providing persistent storage for the system 400. The storage device 430 may be a floppy disk device, a hard disk device, an optical disk device, or a tape device, or other suitable persistent storage means. The input/output devices 450 provide input/output operations for the system 400. In some implementations, the input/output devices 450 include a keyboard and/or pointing device. An input/output device, such as a pointing device or a keyboard, can be used for receiving an identification of a subset of content items identified in a first electronic document. Alternatively or additionally, the identification of the subset of content items can be received from local memory, from a remote source, or by another means, for example, when the subset of content items is identified automatically. In some implementations, the input/output devices 450 include a display unit for displaying graphical representations 460. The system 400 can be connected to a network 480, such as the Internet, an intranet, or an ad hoc network. Information can be accessed and read from the network 480, such as electronic documents and their contents. For example, the system 400 can include a communication interface for receiving web pages and other types of electronic documents from a remote web server or from another type of system. The system 400 can connect through the network 480 to a remote computer system, for example, a web server or another type of system.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving an identification of a subset of a plurality of content items identified in a first electronic document, the first electronic document comprising data for generating a first graphical representation of the plurality of content items based at least in part on initial values of layout properties for the plurality of content items, the subset of content items comprising less than all of the plurality of content items identified in the first electronic document, each content item in the subset of content items including displayable data designated for inclusion in a new electronic document based on a user interaction;
    identifying a prioritization of the subset of content items;
    executing instructions on a data processing apparatus to select a first content item of the subset of content items based on the prioritization;
    executing instructions on a data processing apparatus to calculate a new value of a first layout property for the selected content item based at least in part on one or more of the initial values of layout properties for the plurality of content items, wherein the first layout property comprises a width, a first object in the first electronic document includes an identification of the first content item, the first object has a parent object in the first electronic document, the parent object has a plurality of subordinate objects in the first electronic document, the plurality of subordinate objects includes the first object, and calculating the new value of the layout property for the first content item comprises:
        identifying that a value of the width for the first content item is less than a value of the width for the parent object;
        identifying a group of content items from the subset of content items, where each content item in the group is identified in one of the subordinate objects and vertically intersects the first content item in the first graphical representation; and
        calculating the new value based on a difference between the value of the width for the parent object and a value of a combined width for the group of content items; and
    executing instructions on a data processing apparatus to generate the new electronic document including:
        an identification of the new value; and
        data for generating a second graphical representation of the subset of content items based at least in part on the new value.

2. The method of claim 1, wherein the first layout property comprises a size dimension, and the first content item appears larger in the second graphical representation than in the first graphical representation based on the new value of the size dimension for the first content item being greater than an initial value of the size dimension for the first content item.

3. The method of claim 1, wherein generating the second graphical representation based at least in part on the new value results in the second graphical representation defining less unused space than a graphical representation of the subset of content items generated based in part on an initial value of the first layout property for the first content item.

4. The method of claim 1, wherein identifying a prioritization of the subset of content items comprises:
    identifying a two dimensional area of each content item in the subset; and
    generating an ordered list of the content items according to an ordering of the identified areas.

5. The method of claim 1, wherein selecting a first content item of the subset of content items based on the prioritization comprises selecting the first content item based on the first content item having a higher priority level than other content items in the subset of content items.

6. The method of claim 1, further comprising, subsequent to calculating the new value for the first content item, executing instructions on a data processing apparatus to select a second content item of the subset based on the prioritization;
    executing instructions on a data processing apparatus to calculate a new value of the first layout property for the second content item; and
    wherein the new electronic document further includes an identification of the new value for the second content item and the second graphical representation is based in part on the new value for the second content item.

7. The method of claim 1, wherein identifying that a value of the width for the first content item is less than a value of the width for the parent object comprises identifying that a difference between the value of the width for the parent object and the value of the width for the first content item is greater than a threshold value.

8. The method of claim 1, wherein the first electronic document identifies a hierarchical structure including a plurality of objects that identify the plurality of content items, the hierarchical structure including a root object, the method further comprising:

executing instructions on a data processing apparatus to generate a list of the subset of content items based on the prioritization;

executing instructions on a data processing apparatus to sequentially select each content item on the list, wherein each time a content item is selected, the hierarchical structure is traversed from an object associated with the selected content item to the root object to determine whether to calculate a new value of the first layout property for one or more parent objects of the object associated with the selected content item.

9. The method of claim 1, wherein the subset of content items includes at least one of an image content item or a text content item.

10. The method of claim 1, wherein the first electronic document comprises a web page and the new electronic document comprises a final format document.

11. The method of claim 1, wherein the first electronic document and the new electronic document include an identification of a style sheet including attribute data for generating graphical representations, and the new electronic document includes an inline style attribute that includes the identification of the new value.

12. The method of claim 1, wherein calculating a new value of a first layout property for the selected content item includes calculating a new value of the layout property for an object in the first electronic document.

13. The method of claim 1, further comprising receiving, through a graphical user interface, a user selection designating the displayable data to be included in the new electronic document, and wherein the second graphical representation includes only the displayable data designated by the user selection.

14. A non-transitory computer storage medium encoded with a computer program, the program including instructions that when executed by data processing apparatus cause the data processing apparatus to perform operations comprising:

receiving an identification of a subset of a plurality of content items identified in a first electronic document, the first electronic document including data for generating a first graphical representation of the plurality of content items based at least in part on initial values of layout properties for the plurality of content items, the subset of content items including less than all of the plurality of content items identified in the first electronic document, each content item in the subset of content items comprising displayable data designated for inclusion in a new electronic document based on a user interaction;

identifying a prioritization of the subset of content items;

selecting a first content item of the subset of content items based on the prioritization;

calculating a new value of a first layout property for the selected content item based at least in part on one or more of the initial values of layout properties for the plurality of content items, wherein the first layout property comprises a width, a first object in the first electronic document includes an identification of the first content item, the first object has a parent object in the first electronic document, the parent object has a plurality of subordinate objects in the first electronic document, the plurality of subordinate objects includes the first object, and calculating the new value of the layout property for the first content item comprises:

identifying that a value of the width for the first content item is less than a value of the width for the parent object;

identifying a group of content items from the subset of content items, where each content item in the group is identified in one of the subordinate objects and vertically intersects the first content item in the first graphical representation; and calculating the new value based on a difference between the value of the width for the parent object and a value of a combined width for the group of content items; and generating the new electronic document that includes:
an identification of the new value; and
data for generating a second graphical representation of the subset of content items based at least in part on the new value.

15. The computer storage medium of claim 14, wherein the first electronic document comprises a web page and the new electronic document comprises a final format document.

16. The computer storage medium of claim 14, wherein the first electronic document identifies a hierarchical structure including a plurality of objects that identify the plurality of content items, the hierarchical structure including a root object, the operations further comprising:

generating a list of the subset of content items based on the prioritization;

sequentially selecting each content item on the list, wherein each time a content item is selected, the hierarchical structure is traversed from an object associated with the selected content item to the root object to determine whether to calculate a new value of the first layout property for one or more parent objects of the object associated with the selected content item.

17. The computer storage medium of claim 14, wherein the computer program comprises at least one of a plug-in application for a web browser or a plug-in application for a wireless application protocol browser.

18. The computer storage medium of claim 14, wherein the computer program comprises an application that operates independent of a web browser application.

19. A system comprising:
a display device operable to present a graphical representation of an electronic document;
one or more data processors operable to provide data to the display device and to execute operations comprising:
receiving an identification of a subset of a plurality of content items identified in a first electronic document, the first electronic document including data for generating a first graphical representation of the plurality of content items based at least in part on initial values of layout properties for the plurality of content items, the subset of content items including less than all of the plurality of content items identified in the first electronic document, each content item in the subset of content items including displayable data designated for inclusion in a new electronic document based on a user interaction;
identifying a prioritization of the subset of content items;
selecting a first content item of the subset of content items based on the prioritization;
calculating a new value of a first layout property for the selected content item based at least in part on one or more of the initial values of layout properties for the plurality of content items, wherein the first layout property comprises a width, a first object in the first electronic document includes an identification of the first content item, the first object has a parent object in the first electronic document, the parent object has a plurality of subordinate objects in the first electronic document, the plurality of subordinate objects includes the first object, and calculating the new value of the layout property for the first content item comprises:
  identifying that a value of the width for the first content item is less than a value of the width for the parent object;
  identifying a group of content items from the subset of content items, where each content item in the group is identified in one of the subordinate objects and vertically intersects the first content item in the first graphical representation; and
  calculating the new value based on a difference between the value of the width for the parent object and a value of a combined width for the group of content items; and
generating the new electronic document that includes:
  an identification of the new value; and
  data for generating a second graphical representation of the subset of content items based at least in part on the new value.

20. The system of claim 19, wherein the data processors are included in at least one of a personal computer running a web browser or a mobile device running a wireless application protocol browser.

21. The system of claim 19, wherein the first electronic document identifies a hierarchical structure including a plurality of objects that identify the plurality of content items, the hierarchical structure including a root object, the operations further comprising:
  generating a list of the subset of content items based on the prioritization;
  sequentially selecting each content item on the list, wherein each time a content item is selected, the hierarchical structure is traversed from an object associated with the selected content item to the root object to determine whether to calculate a new value of the first layout property for one or more parent objects of the object associated with the selected content item.

* * * * *